(12) United States Patent
Potter

(10) Patent No.: US 12,181,114 B2
(45) Date of Patent: *Dec. 31, 2024

(54) IR ILLUMINATOR WITH ASYMETRIC RADIATION PATTERN

(71) Applicant: Valeo North America, Inc., Troy, MI (US)

(72) Inventor: Brant Potter, Seymour, IN (US)

(73) Assignee: Valeo North America, Inc., Troy, MI (US)

(*) Notice: Subject to any disclaimer, the term of this patent is extended or adjusted under 35 U.S.C. 154(b) by 405 days.

This patent is subject to a terminal disclaimer.

(21) Appl. No.: 17/667,066

(22) Filed: Feb. 8, 2022

(65) Prior Publication Data

US 2022/0154902 A1    May 19, 2022

Related U.S. Application Data

(62) Division of application No. 16/246,002, filed on Jan. 11, 2019, now Pat. No. 11,274,800.

(51) Int. Cl.
 F21S 41/13 (2018.01)
 B60Q 1/00 (2006.01)
 (Continued)

(52) U.S. Cl.
 CPC ............ F21S 41/13 (2018.01); B60Q 1/0094 (2013.01); B60Q 1/0483 (2013.01); B60Q 1/28 (2013.01);
 (Continued)

(58) Field of Classification Search
 CPC .......................... B60Q 2300/103; F21S 41/13
 See application file for complete search history.

(56) References Cited

U.S. PATENT DOCUMENTS

| 6,642,955 B1 | 11/2003 | Midgley et al. |
| 7,217,020 B2 | 5/2007 | Finch |

(Continued)

FOREIGN PATENT DOCUMENTS

| CN | 104407488 A | 3/2015 |
| EP | 442934 A1 | 8/2004 |

(Continued)

OTHER PUBLICATIONS

Dannheim et al., Weather detection in vehicles by means of camera and LIDAR systems (2014).

(Continued)

*Primary Examiner* — Robert J May
(74) *Attorney, Agent, or Firm* — Valeo North America, Inc.

(57) ABSTRACT

An IR illuminator provides infrared radiation for a digital camera that includes a camera lens including a camera field of view; also including equidistant mounting substrates arranged adjacent to the digital camera with IR LEDs mounted to each mounting substrates and a cover lens positioned over the IR LEDs. The free-form cover lens shape facilitates an emitted radiation emission pattern but prevents visible light reflectivity into the camera lens such that the IR radiation emission pattern has an asymmetric field of view. Two IR illuminators near the camera are angled away from the camera optical direction. The cover lens may be a Fresnel lens, may include a diffractive layer or a collimator to shift radiation emitted from the LED towards an asymmetric distribution.

6 Claims, 12 Drawing Sheets

(51) Int. Cl.
   *B60Q 1/04* (2006.01)
   *B60Q 1/28* (2006.01)
   *F21S 43/14* (2018.01)
   *G02B 3/02* (2006.01)
   *G05D 1/00* (2006.01)

(52) U.S. Cl.
   CPC ............... *F21S 43/14* (2018.01); *G02B 3/02* (2013.01); *G05D 1/0242* (2013.01); *B60R 2300/103* (2013.01)

(56) References Cited

U.S. PATENT DOCUMENTS

| | | |
|---|---|---|
| 7,804,251 B2 | 9/2010 | Wang |
| 8,323,177 B2 | 12/2012 | Wong et al. |
| 8,408,821 B2 | 4/2013 | Wu et al. |
| 8,816,306 B2 | 8/2014 | Yano, Jr. et al. |
| 2009/0200496 A1 | 8/2009 | Barie et al. |
| 2010/0321497 A1 | 12/2010 | Onishi et al. |
| 2013/0155705 A1 | 6/2013 | Peck et al. |
| 2014/0015977 A1 | 1/2014 | Taylor et al. |
| 2015/0288948 A1 | 10/2015 | Schamp et al. |
| 2016/0039541 A1 | 2/2016 | Beardsley et al. |
| 2016/0100084 A1 | 4/2016 | Schofield et al. |
| 2017/0106892 A1 | 4/2017 | Lisseman et al. |
| 2017/0217361 A1 | 8/2017 | Miller |
| 2018/0143306 A1 | 5/2018 | Elooz et al. |
| 2018/0294389 A1 | 10/2018 | Tarsa et al. |
| 2019/0096068 A1 | 3/2019 | Fontanel et al. |
| 2019/0162953 A1 | 5/2019 | Bretagnol et al. |
| 2019/0171004 A1 | 6/2019 | Bretagnol et al. |

FOREIGN PATENT DOCUMENTS

| | | |
|---|---|---|
| WO | 9950596 A2 | 10/1999 |
| WO | 2008037049 A1 | 4/2008 |

OTHER PUBLICATIONS

Patent Cooperation Treaty, International Searh Report and Written Opinion of the International Searching Authority for Application No. PCT/US2020/013330 (May 13, 2020).

Vitas et al., Traffic light detection in autonomous driving systems (2020).

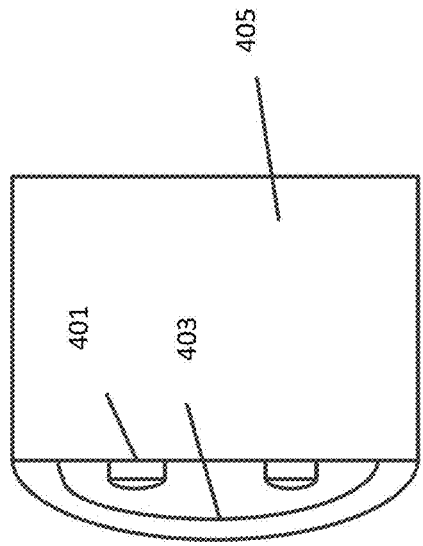
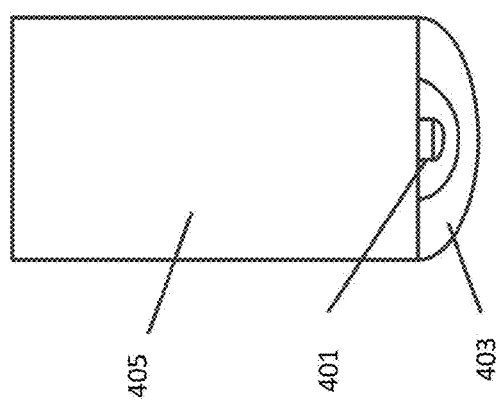
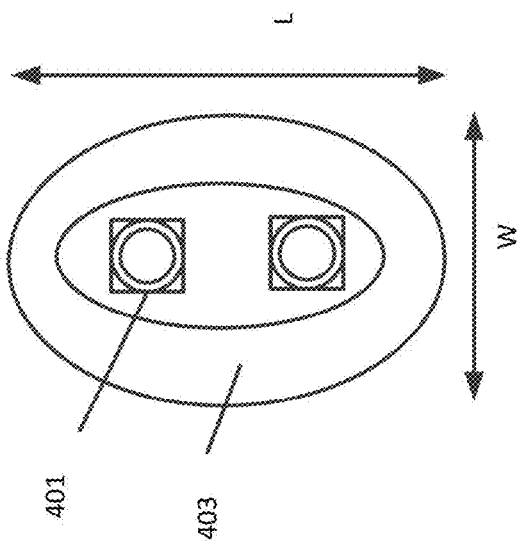

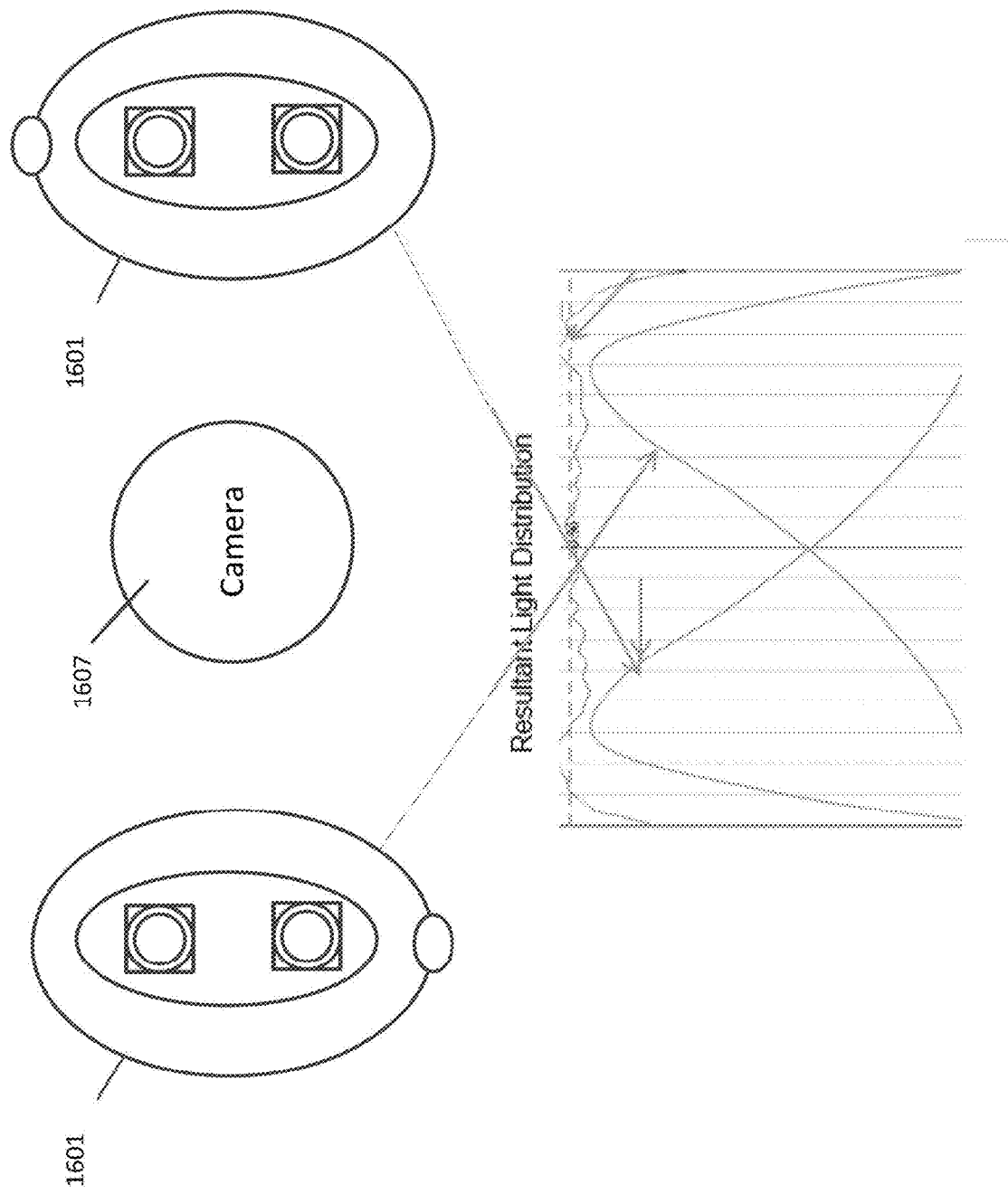

IR ILLUMINATOR WITH ASYMETRIC RADIATION PATTERN

CROSS-REFERENCE TO RELATED APPLICATIONS

This application is a division of U.S. application Ser. No. 16/246,002 filed Jan. 11, 2019 (published as US2020/0224843), the disclosure of which is herein incorporated by reference in its entirety.

TECHNICAL FIELD

The present disclosure relates generally to lighting for a vehicle camera, and in particular, IR illuminator design optimized to avoid camera field-of view.

BACKGROUND OF THE INVENTION

Camera systems play an important role in autonomous vehicles and driver assist system applications. Among the various types of sensors used in autonomous vehicles, cameras are the only sensor technology that can capture color and contrast information at a level of detail that enables object classification. Cameras enable driver assist system applications such as adaptive cruise control, automatic emergency braking, forward collision warning, automatic high beam control, traffic sign recognition, lane keep systems, parking assist, cross-traffic alert, and rear-view mirror. Cameras may also be included inside the vehicle cabin for such features as gaze tracking, presence detection and gesture recognition. However, camera systems are susceptible to weather conditions, variations in lighting, and their exposed lenses may be accidentally damaged.

A general sensor arrangement for an autonomous vehicle is shown in FIG. 1. The arrangement of FIG. 1 includes long-range radar as a sensor for adaptive cruise control, several vision cameras, such as forward stereo cameras, surround cameras, rear and side cameras. Vision cameras 105, 107, 109 may facilitate features including traffic sign recognition, lane departure warning, digital side mirror, park assist, and rear view. Vision cameras, or alternatively an optional LiDAR 103, may be used as a sensor for viewing the entire surroundings around the vehicle and for obtaining video information for emergency braking, pedestrian detection, collision avoidance, and short/medium range radar for use in cross traffic alerting, rear collision warning, and blind spot detection.

BRIEF SUMMARY OF THE INVENTION

According to an embodiment of the present disclosure, there is provided an infrared (IR) illuminator and method of operating that provides IR radiation for a vision camera having a wide-angle lens with a respective wide field of view, including an illuminator structure arranged adjacent to the vision camera, at least one IR LED mounted to the illuminator structure, and a cover lens positioned to cover the at least one IR LED. The cover lens changes IR radiated by the IR LED from a symmetric pattern into an asymmetric pattern in a manner that prevents emitted infrared radiation from entering into the camera lens.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4A, 4B, 4C are views of a two LED IR illuminator;

FIG. 16 is a schematic diagram of a camera having complementary side-mounted IR illuminators.

DETAILED DESCRIPTION OF THE INVENTION

Figure 1:
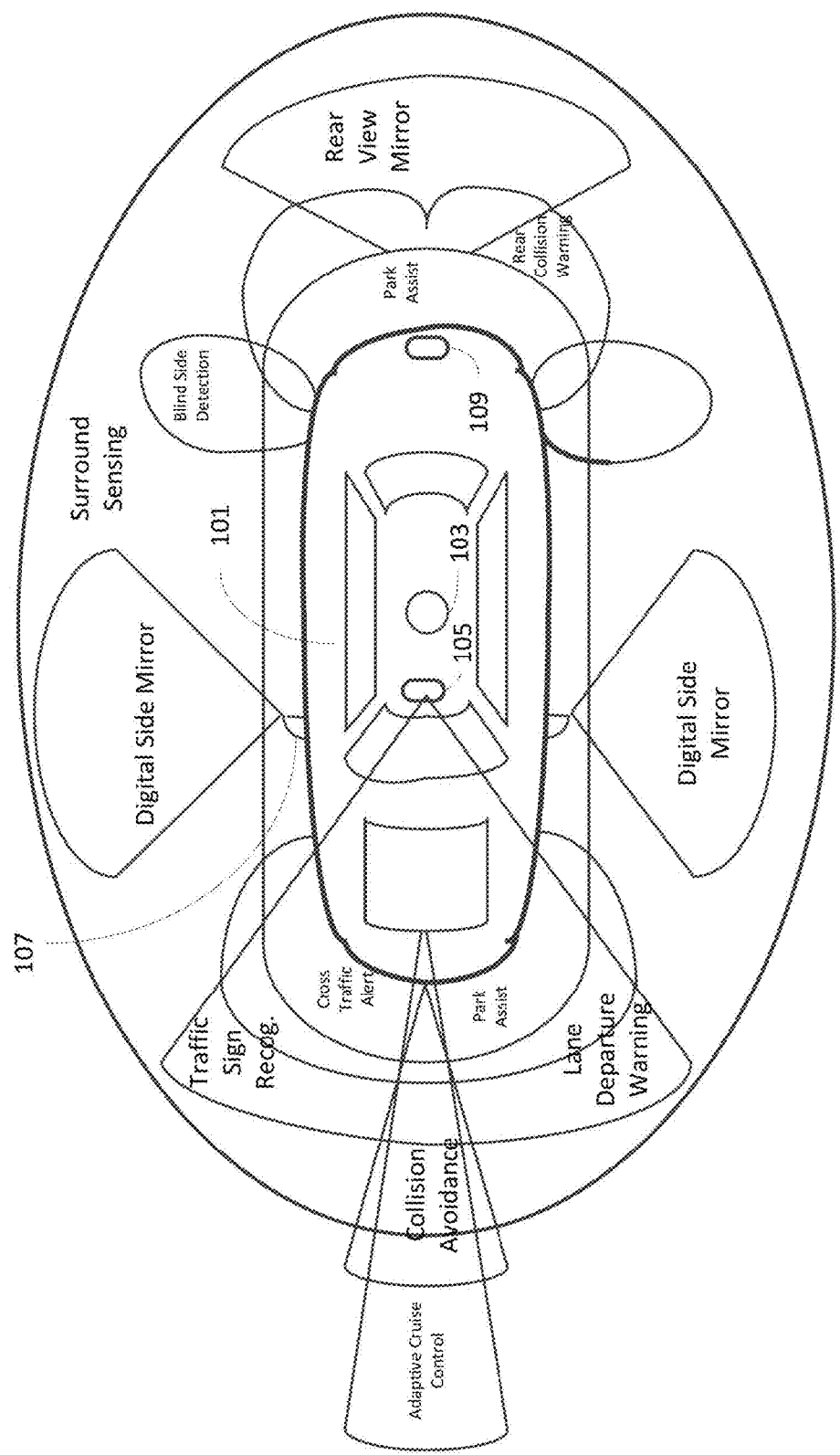
FIG. 1 illustrates a typical sensor arrangement for an autonomous vehicle.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

Furthermore, the terms "approximately," "proximate," "minor," and similar terms generally refer to ranges that include the identified value within a margin of 20%, 10% or preferably 5% in certain embodiments, and any values therebetween.

Referring now to the drawings, wherein like reference numerals designate identical or corresponding parts throughout the several views.

In order to obtain video information for detecting objects in the field of view of the vision camera for a vehicle, the vision camera needs to capture video information under all types of lighting conditions. Vision cameras are able to operate at normal lighting conditions where there is sufficient daylight. However, vehicles must also operate in conditions where lighting is low, due to shading, and of course during early morning or early evening hours. Vehicles must operate during nighttime. During nighttime hours, lighting may be provided by street lights or other sources, but those sources may not sufficiently provide lighting for specific objects that the camera may be focused on. There is a need to provide light that covers the field of view of the vision camera under all lighting conditions, especially during conditions of low light and darkness. Although conditions of low light and darkness relate to conditions where visible light is low to non-existent, other wavelengths of electromagnetic radiation may be used. Lighting conditions may be enhanced using a source of visible light, such as a camera flash or other camera lighting source. However, camera flash or other camera lighting needs to be bright and is not practical for use on vehicles, as vehicles generally have specific lighting constraints, for among other reasons, safety. Camera flash and camera lighting will blind pedestrians and other drivers. One approach to providing lighting for low light and dark conditions has been to use infrared radiation. Infrared radiation generally is a range of the electromagnetic spectrum that is not visible to humans but is in a range than can be captured by cameras. Infrared radiation includes wavelengths that are near the visible range, referred to as near-infrared. Near-infrared is defined as electromagnetic radiation over the range of 0.75 to 1.4 micro meters.

Infrared radiation, similar to visible light, may be reflected off of objects, even including some black objects. Vision cameras may be provided with infrared radiation in order to enhance image capture during low light and nighttime conditions. Subsequently, infrared radiation may be used to augment the available ambient light.

There are various devices that may be used as a source for infrared radiation. Light emitting diodes (LEDs) are increasingly being used to transmit infrared radiation as they are energy efficient and can be implemented in a small space. When infrared (IR) LEDs are used for transmitting infrared (IR) radiation, they are typically enclosed by a cover that protects the LED from the environment and from being damaged. The IR LED and cover are referred to herein as an IR illuminator. The cover for the IR LED may be made IR Black using black pigments that have low infrared reflectivity. The dark lens allows IR radiation to pass, and is commonly referred to as transparent black. The transparent black cover prevents transmission of visible light.

Figure 2:
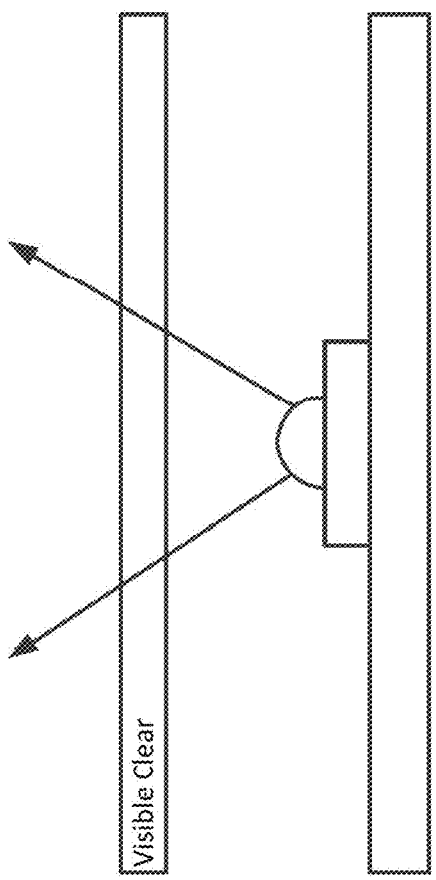
FIG. 2 is a schematic diagram for an IR LED illuminator having a clear cover lens.
Figure 3:
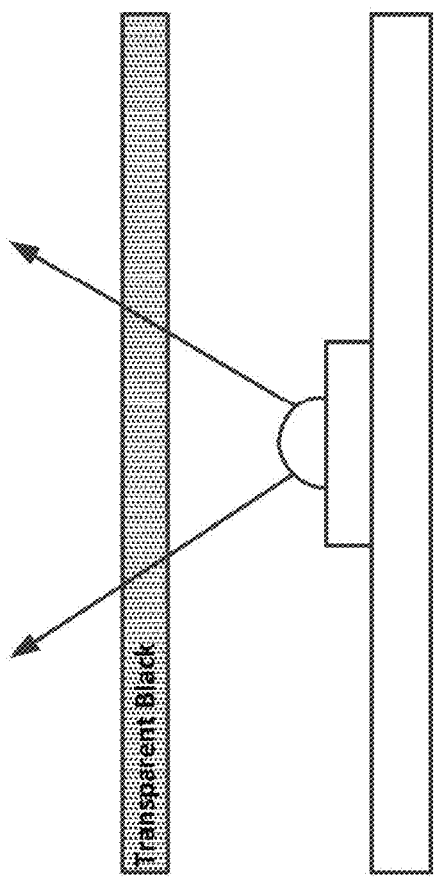
FIG. 3 is a schematic diagram for an IR LED illuminator having a transparent black lens.

In order to provide directed radiation toward an object, the cover for an IR illuminator is provided without a secondary optic, such as a neutral cover. In this disclosure, a neutral cover is a cover that allows visible light and infrared radiation to pass without applying optics. Subsequently, the radiation field of view (FOV) of the IR illuminator is the FOV of the IR LED (approximately half of +/−70 degrees). The cover for the IR LED may be a neutral cover in which a half-angle emission of the LED is in a range of 45 to 70 degrees. A typical neutral cover provides no optical power and may be made of polycarbonate (PC) or polymethyl methacrylate (PMMA). Typically PC is used in the case of an external application that may be subjected to environmental conditions. As shown in FIG. 2 the cover may be clear, but as shown in FIG. 3 typically will include black pigments to make a transparent black lens.

Typical vehicle mounted vision cameras have a field of view (FOV) up to +/−100 degrees. As mentioned above, the half-angle emission of an LED in typical IR illuminators is in the range of approximately 45 to 70 degrees. It is desirable to increase the IR illuminator FOV in order to enhance lighting in the camera FOV.

Vehicle mounted vision cameras and IR illuminators are preferably provided as an assembly, or at least the IR illuminators associated with a vision camera are positioned in close proximity to the camera in order to provide IR radiation that is within the field of view of the camera. Vehicle mounted vision cameras are becoming smaller in size, but are generally incorporated with a wide-angle lens and are limited by focal length. Generally, a diameter of a vision camera lens may be about 35 mm or smaller. In other words, although the vision camera device may have a small diameter lens, the lens is at a specified height above the camera sensor circuit. As a consequence, some of the IR radiation emitted by an IR illuminator mounted adjacent to the vision camera may enter into the camera lens or may be clipped by the camera bezel depending on how the IR illuminator is arranged relative to the vision camera. Thus, increasing the FOV of an IR radiation pattern can lead to elevation of these problems.

Disclosed are embodiments having a secondary optic that increases the IR illuminator emission FOV while avoiding clipping/interfering with the camera FOV, and maintain high optical efficiency and radiation uniformity over the FOV. Embodiments achieve these objectives by a combination of an IR optical design, i.e. design of the illuminator exit surface, placement and orientation of the IR illuminator relative to the camera, and asymmetric distribution of IR radiation.

One type of secondary optic for an IR illuminator is an elliptical lens, and may have an inner surface with a shape that is different from the shape of the outer surface. FIGS. 4A, 4B, 4C are views of an IR illuminator module with an elliptical cover lens. The elliptical cover lens also provides optical characteristics such as radiation diffraction. In FIGS. 4A, 4B, 4C, the IR illuminator module has LEDs 401 covered by a single elliptical cover lens 403. FIG. 4A is an end view of the IR illuminator module. FIG. 4B is a side view of the IR illuminator module. FIG. 4C is a top view of the IR illuminator module. The IR illuminator module of FIGS. 4A, 4B, 4C has a mounting substrate 405 having a flat mounting surface on which the LEDs 401 are mounted. It should be understood that mounting substrates for LEDs are not limited to this configuration and can take many forms and may include mounting surfaces that are curved or rounded. In one embodiment, the elliptical cover lens is approximately the same length as the diameter of the camera lens. The elliptical cover lens is not limited to this dimension, but rather its size is determined based on design requirements for a particular installation as well as dimensions of a vision camera.

In some embodiments, the lens material may be of a transparent thermoplastic such as polycarbonate PC 2245. The polycarbonate PC 2245 typically has a refractive index of 1.569 (at a wavelength of 850 nm) and a linear absorption coefficient of 0.002. It should be understood that the material for the cover lens is not limited to polycarbonate. Other plastic lens materials may be used. Also, the lens material may be glass or a glass laminate and may be made IR Black using black pigments that have low infrared reflectivity.

Figure 5A:
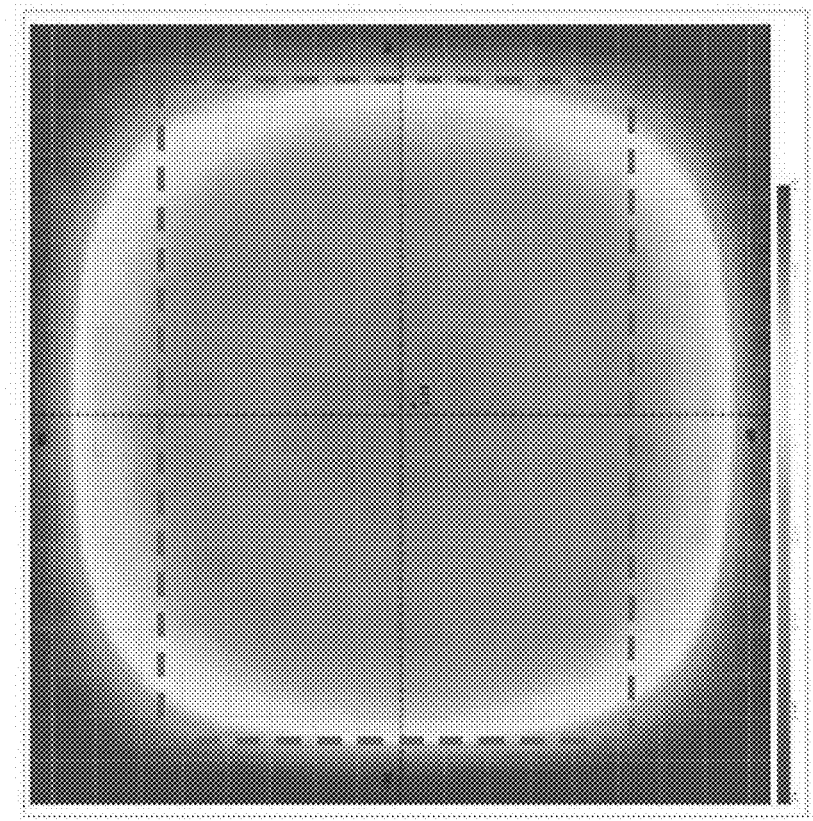
FIGS. 5A and 5B are plots for comparison of radiant intensity between an IR illuminator having a dome-shaped lens and an IR illuminator having a flat neutral lens.
Figure 5B:
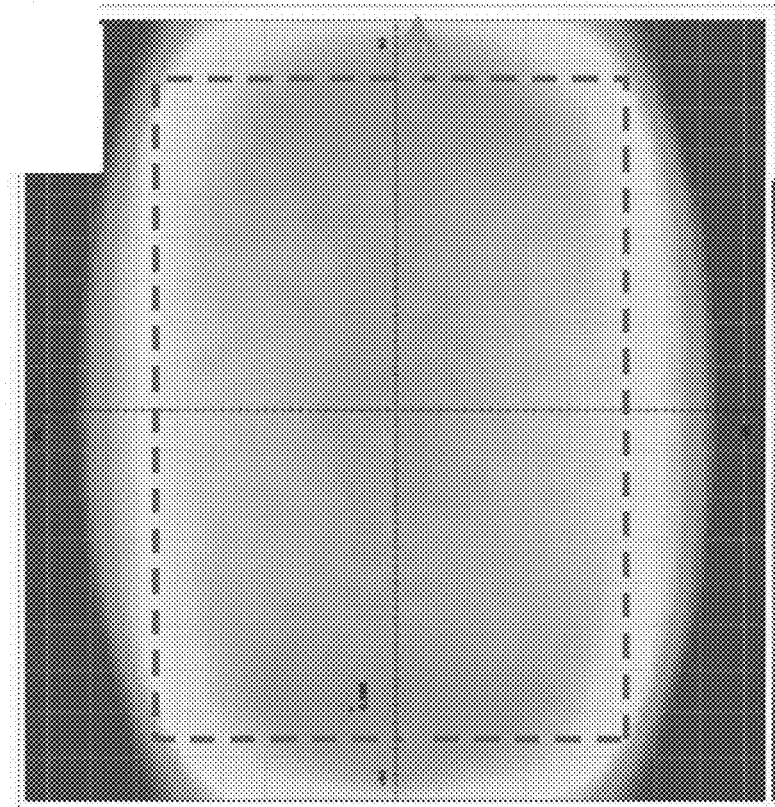

FIGS. 5A and 5B illustrate a comparison between the radiant intensity of two IR illuminator modules with the elliptical cover lens and IR illuminator modules having a flat neutral lens, respectively. FIG. 5A illustrates the performance of an IR illuminator using two IR illuminator modules of FIGS. 4A, 4B, 4C each having a single cover lens with elliptical surfaces and a pair of LEDs. The plot extends over a maximum range of +/−90 degrees by 90 degrees. The plot in FIG. 5A illustrates that the IR illuminator modules with the elliptical cover lens has a larger radiation pattern and better uniformity than the LED with the flat neutral lens of FIG. 5B. In particular, the plot in FIG. 5A illustrates that the elliptical cover lens provides an increase in radiation FOV and uniformity that extends to beyond +/−80 degrees.

Figure 6:
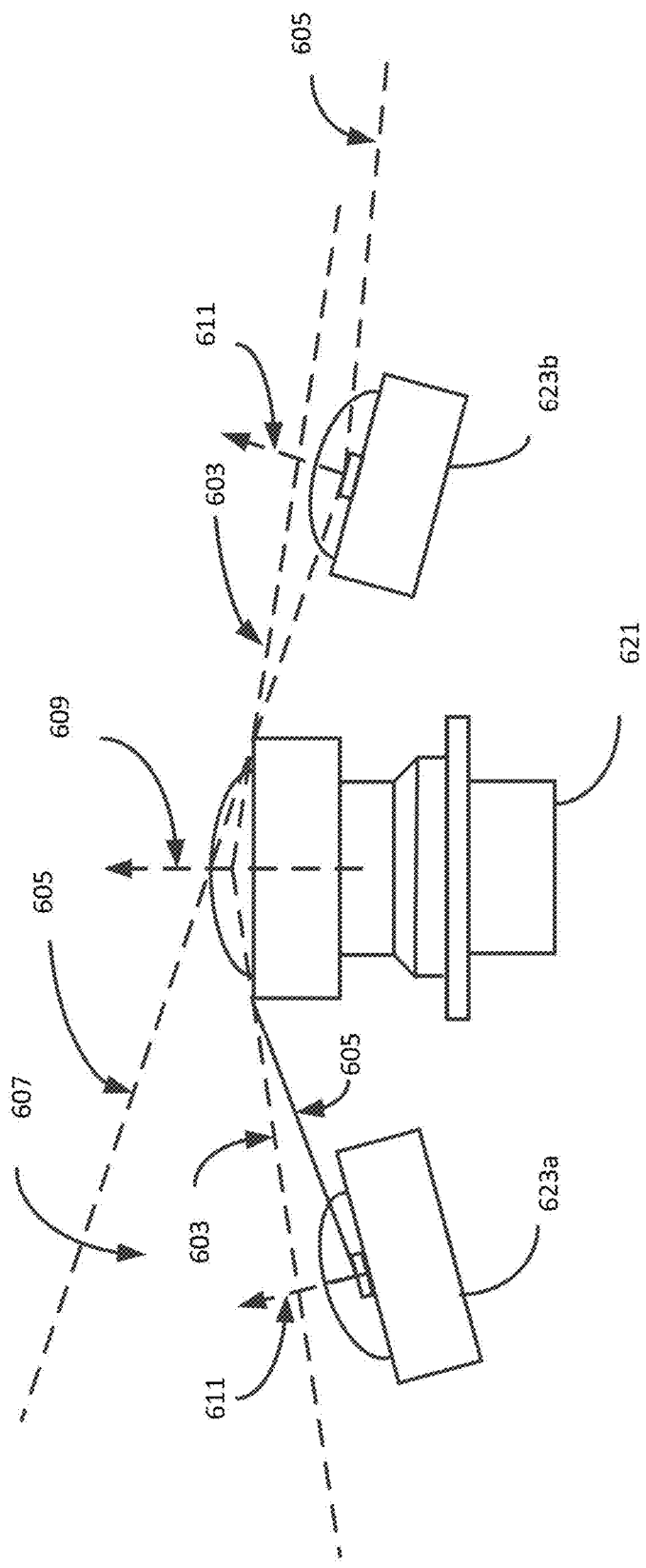
FIG. 6 is a schematic diagram for a camera with side-mounted IR illuminators.

FIG. 6 is a schematic illustrating a relationship between the beam pattern FOV of the IR illuminator and the FOV of the camera. It is an objective to have an illuminator having a maximum beam pattern in the camera FOV while maintaining a compact camera-illuminator assembly. In some embodiments, the IR illuminator 623a, 623b is positioned relative to the camera 621 to meet these illumination conditions. First, the top of the illuminator 623a, 623b where radiation is emitted must be below the FOV of the camera 621 (see line 603 indicating the camera FOV). This condition must be met to prevent parasitic radiation (such as sun reflections, scatter from dust on the illuminator lens) from entering the camera 621. Second, the radiation pattern of the IR illuminator 623a, 623b (see radiation edge 605) must not intercept/clip the camera lens. This condition must be met to prevent IR illuminator radiation from directly entering the camera lens, and thus reducing image quality. The inventor has determined that it is difficult to achieve an IR illuminator FOV of +/−100 degrees while avoiding illumination radiation clipping the camera. In one embodiment, to reduce illuminator clipping by the camera 621, the illuminator axis 611 is tilted approximately 10 degrees from the optical axis 609 of the camera 621. The choice of size of the tilt angle of the illuminator depends on the FOV requirements of the camera system. The tilt angle may be adjusted to maximize the extent that the beam pattern of the IR illuminator 623 covers the FOV of the camera 621.

Figure 7:
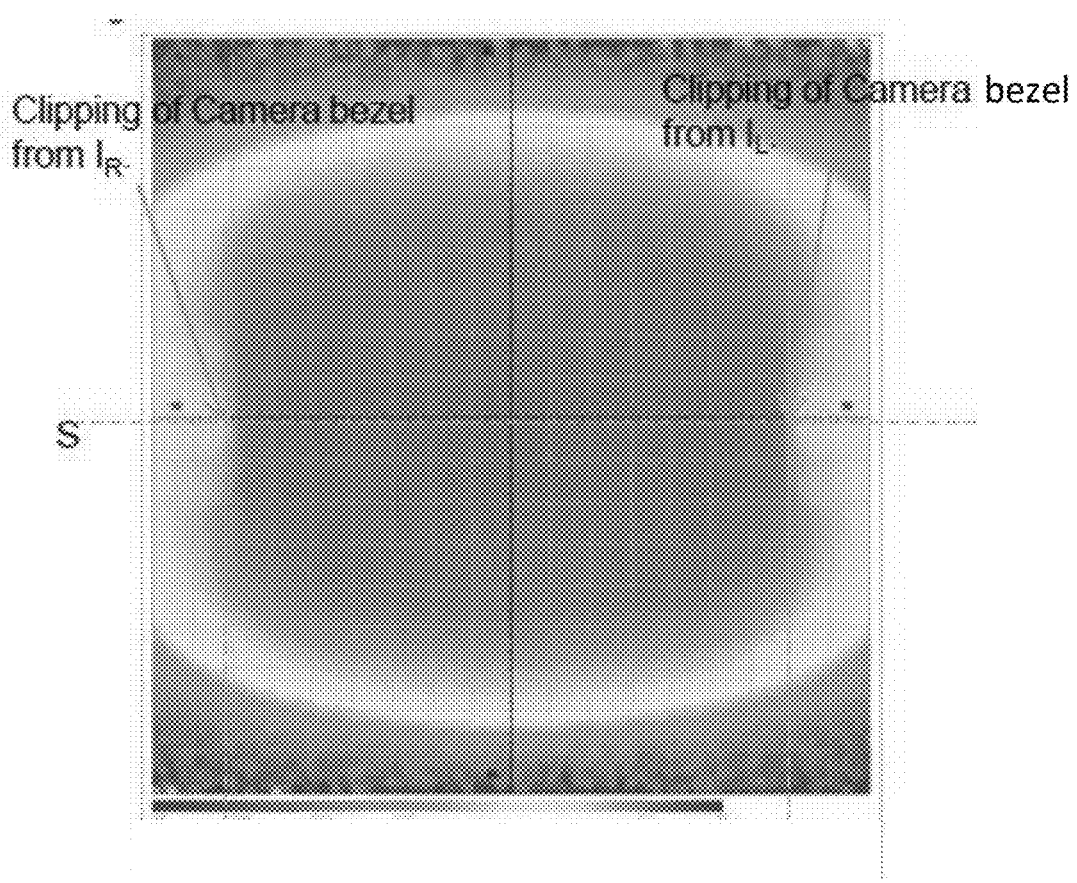
FIG. 7 is a plot of radiant intensity for the IR illuminator of FIG. 6.

FIG. 7 is a plot of radiant intensity for the IR illuminator of FIG. 6. As shown in the plot, when two illuminators are tilted at 10 degrees, some clipping by the camera bezel occurs. The camera bezel causes the extent of the region of radiation that has good uniformity to be reduced. The inventor has determined that substantial clipping by the camera bezel may occur depending on the illuminator tilt angle. Large tilt angles have been determined to result in reduction in radiation uniformity. It is noted that the range of tilt angle that may lead to clipping is dependent on the distance between the IR illuminator and the camera.

Figure 8:
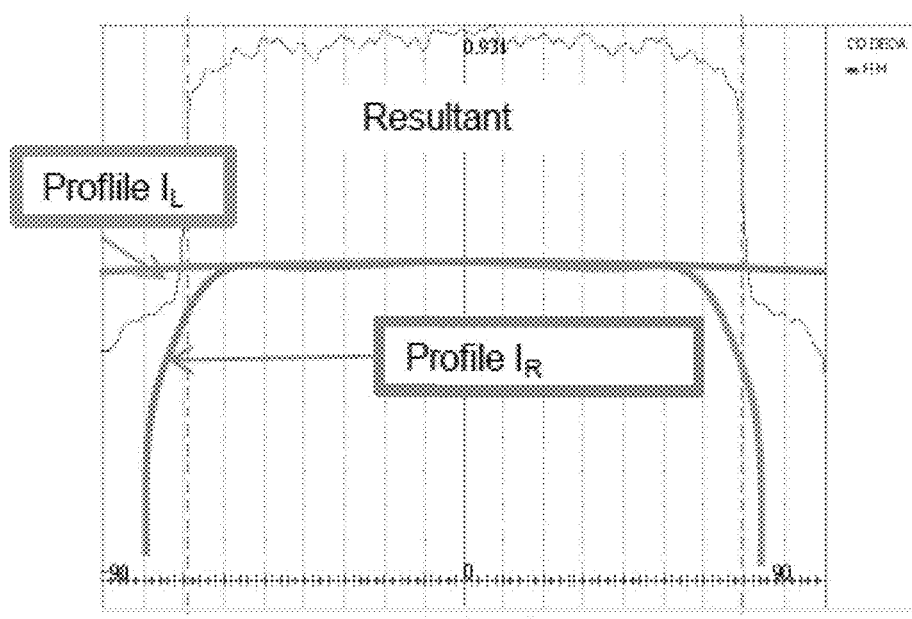
FIG. 8 is a graph of the radiant intensity of FIG. 7.

FIG. 8 is a graph of the radiant intensity of FIG. 7. In FIG. 8, it can be seen that the resultant horizontal intensity profile IR due to clipping of the camera bezel is less than +/−90 degrees.

Figure 9:
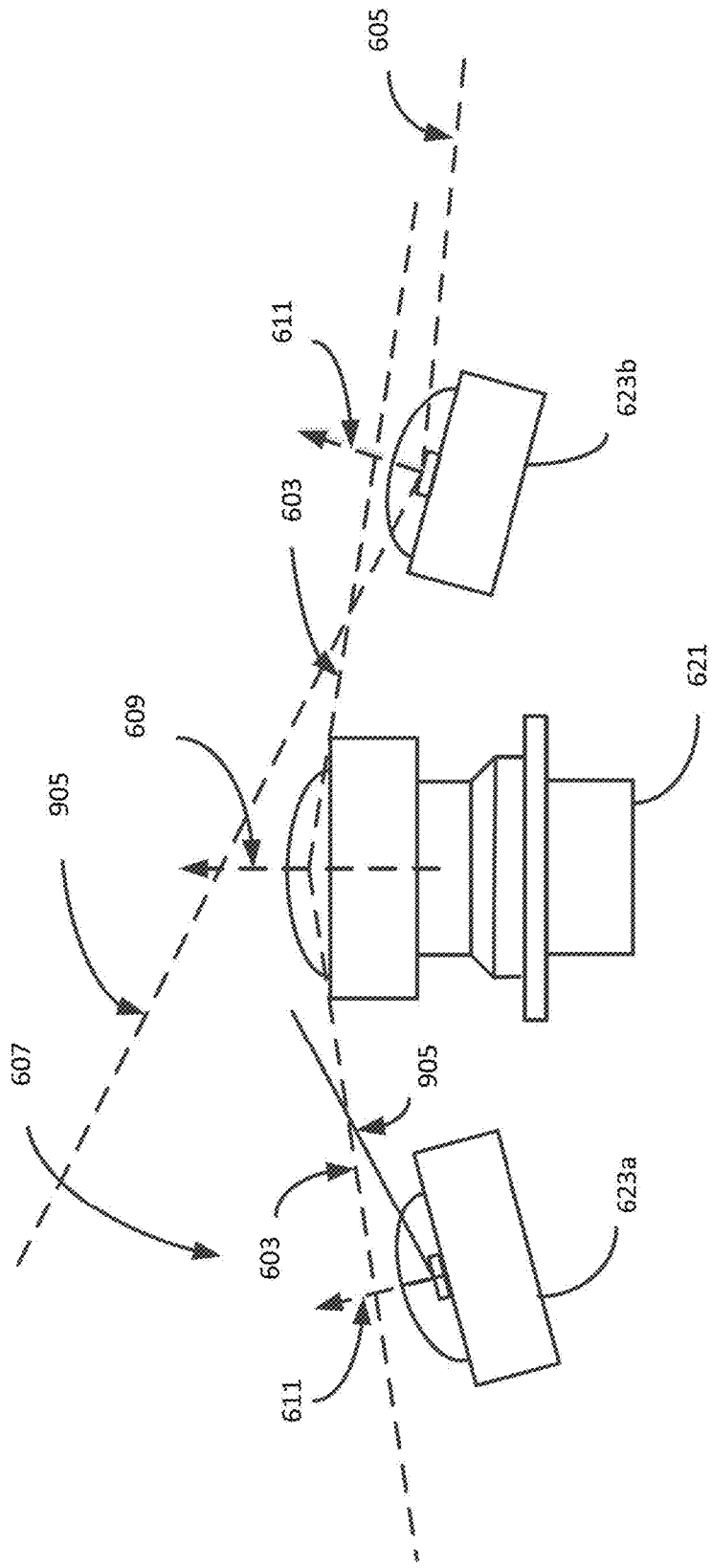
FIG. 9 is a schematic diagram for a camera with side-mounted IR illuminators in accordance with an exemplary aspect of the disclosure.

FIG. 9 is a schematic diagram of an assembly for a camera with side-mounted IR illuminators in accordance with an exemplary aspect of the disclosure. In order to increase the extent of good uniformity by reducing the effect of clipping by the camera bezel, the radiation distribution of each IR illuminator may be made asymmetrical about the optical axis (i.e., the angle of the radiation source distribution pattern is made smaller at one side). In particular, the camera 621 may have IR illuminators 623a and 623b arranged adjacent to the camera 621 on opposite sides. The camera 621 and IR illuminators may be mounted on a common mounting substrate, or may be mounted in a bracket arrangement in which the IR illuminators on respective mounting substrates and attached to the camera 621 by way of a bracket structure.

A pair of IR illuminators 623a and 623b together increase the FOV of the IR distribution pattern in which the IR radiation is substantially maximum uniform intensity. The IR illuminator 623a biases intensity to the left, away from the camera 621. The IR illuminator 623b biases intensity to the right. As a result, one IR illuminator 623a and another IR illuminator 623b together increase the extent of the maximum uniform infrared pattern FOV, by providing improved radiation uniformity, while avoiding clipping by the camera 621.

Figure 10:
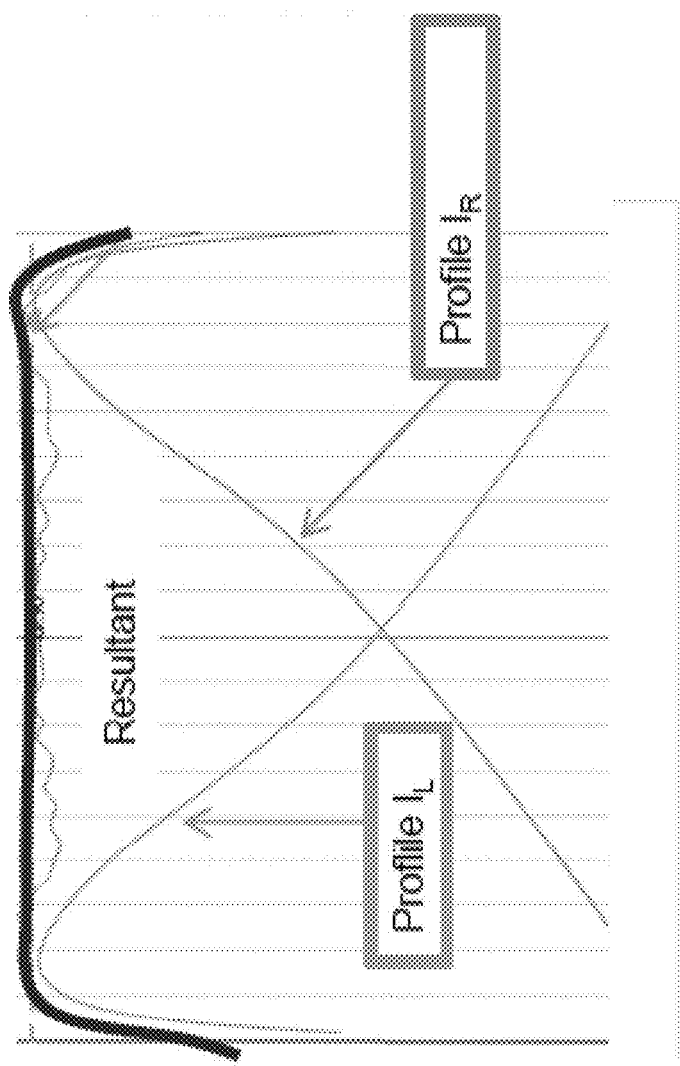
FIG. 10 is a graph of the radiant intensity for the IR illuminator of FIG. 9.

FIG. 10 is a graph of the resultant radiant intensity for the IR illuminator of FIG. 9. The figure illustrates that the IR illuminator 623a biases maximum intensity to the left outward, and the IR illuminator 623b biases intensity to the right outward, such that the resultant horizontal intensity profile for the pair of IR illuminators can be increased to approximately +/−80 degrees.

Figure 11:
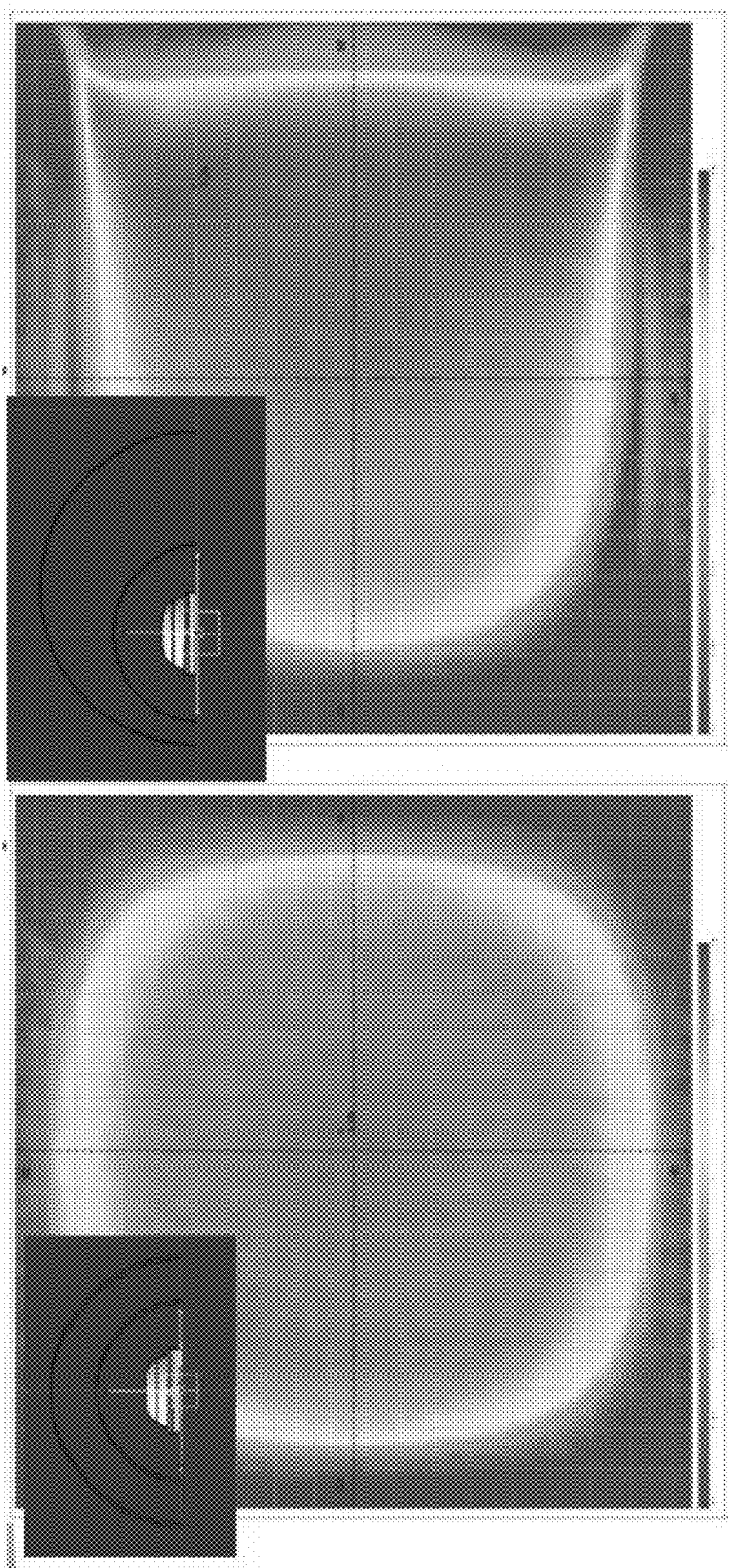
FIGS. 11A and 11B are plots for comparison of radiant intensity between an IR illuminator having a symmetric dome-shaped lens and an IR illuminator having an asymmetric dome-shaped lens.

FIGS. 11A and 11B are plots for a comparison of radiant intensity between an IR illuminator having a symmetric dome-shaped lens and an IR illuminator having an asymmetric dome-shaped lens. FIG. 11B illustrates the skewed shape of the bias of radiant intensity that can be achieved by using an asymmetric pattern relative to the symmetric pattern of FIG. 11A. FIG. 11B illustrates that the skewed shape of the uniform radiant intensity may be formed to be substantially squared, i.e., area of maximum intensity extends towards corners of a FOV as opposed to being edges of maximum intensity that is oval or rounded, at a side away from the camera at approximately in a range of 75 to 85 degrees from the center axis of the IR illuminator.

Figure 12:
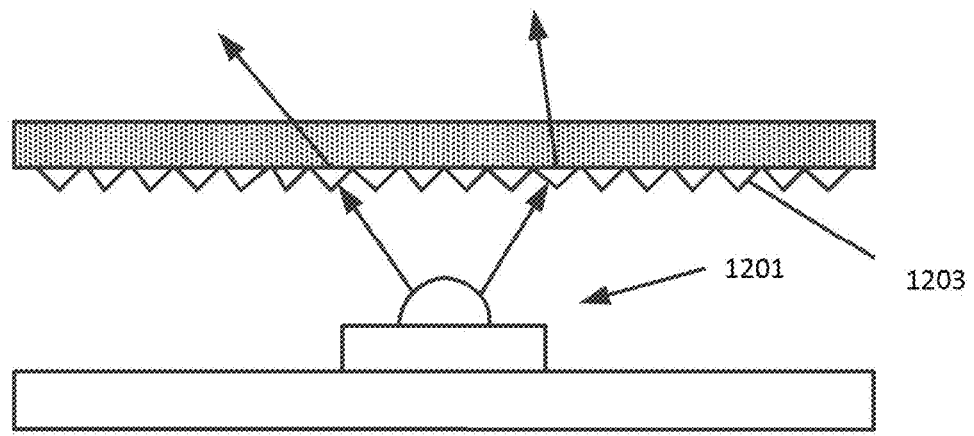
FIG. 12 is a schematic diagram for an IR LED illuminator having a Fresnel lens or micro optics.
Figure 13:
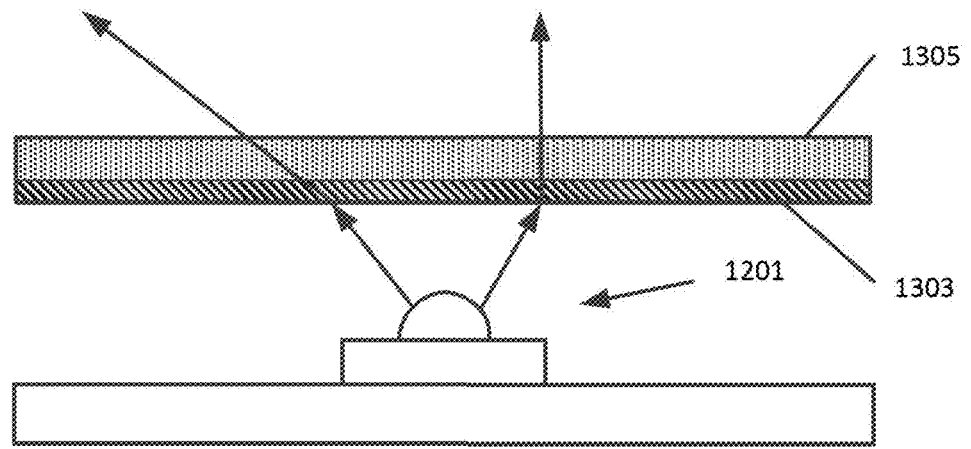
FIG. 13 is a schematic diagram for an IR LED illuminator having a cover lens and a diffractive film or micro-optics.
Figure 14:
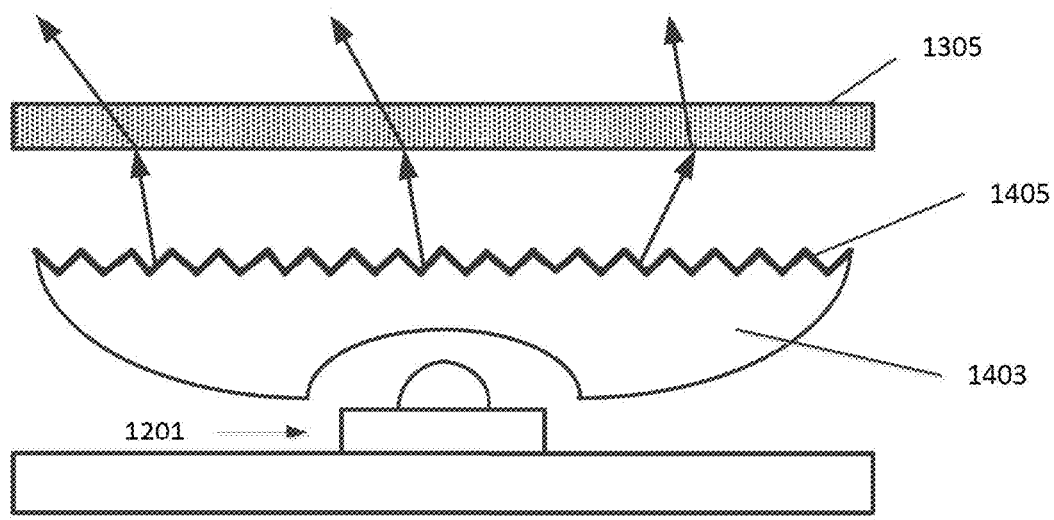
FIG. 14 is a schematic diagram for an IR LED illuminator having a cover lens and a collimator.

There are various types of optical arrangements that may be used to achieve asymmetrical IR radiation distribution. FIGS. 12, 13, and 14 provide some example arrangements.

FIG. 12 is a schematic diagram for an IR LED illuminator having a Fresnel lens or micro optics as a cover lens for the IR LED. A Fresnel lens 1203 or other micro optics may be used to shift the IR radiation pattern of one or more IR LEDs 1201 to illuminate radiation in an asymmetrical distribution.

FIG. 13 is a schematic diagram for an IR LED illuminator having a cover lens and a diffractive film or diffractive optics. A diffractive film 1303 or diffractive optics may be formed on a surface of the cover lens 1305 to shift the IR radiation pattern from one or more IR LEDs 1301 to illuminate radiation in an asymmetrical distribution.

FIG. 14 is a schematic diagram for an IR LED illuminator having a cover lens and a collimator. A collimator 1403 having exit optics 1405 may be used to shift the IR radiation pattern from one or more IR LEDs 1401 to illuminate radiation in an asymmetrical distribution out of the cover lens 1305.

Figure 15:
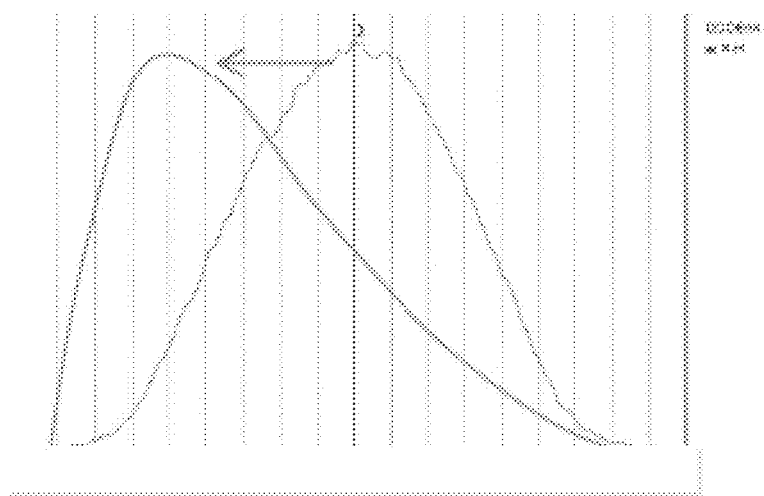
FIG. 15 is a graph of radiation distribution for the IR LED illuminator having asymmetrical distribution.

FIG. 15 is a graph of radiation distribution for the IR LED illuminator having asymmetrical distribution. In each approach, the IR radiation distributed from an IR illuminator having optics such as that shown in FIG. 12, 13, or 14 shifts the radiation distribution toward an asymmetric radiation distribution.

The asymmetric radiation distribution may be accomplished without having to use different IR illuminators for a camera assembly. FIG. 16 is a schematic diagram of a camera having complementary side-mounted IR illuminators. In one embodiment, an identical IR illuminator 1601 may be used for each of the right illuminator and the left illuminator mounted adjacent to opposing sides of the camera 1607 by rotating the lens element by 180 degrees to enable complementary asymmetrical patterns.

Numerous modifications and variations of the present invention are possible in light of the above teachings. It is therefore to be understood that within the scope of the appended claims, the invention may be practiced otherwise than as specifically described herein.

What is claimed is:

1. A method of operating an IR illuminator for a vision camera having a wide-angle lens with a respective wide field of view, the method comprising:
    capturing images by the vision camera in the camera field of view;
    transmitting IR radiation by an IR LED as symmetric radiation pattern;
    changing the IR radiated by the IR LED from the symmetric pattern into an asymmetric pattern with a cover optic in a manner that prevents emitted infrared radiation from entering into the camera lens.

2. The method of claim 1, wherein the vision camera has an optic axis in a direction of focus,
    wherein a center axis in a direction that the at least one IR LED is facing is tilted from the optic axis by an angle in a range of five degrees to fifteen degrees,
    wherein the changing, by the cover optic, shifts the symmetric pattern to an asymmetric pattern in which a center of maximum intensity of the emitted IR radiation is biased toward a direction away from the camera.

3. The method of claim 2, wherein the changing shifts the symmetric pattern to an asymmetric pattern in which a center of maximum intensity of the emitted IR radiation is biased toward the edge of the IR field of view in a direction away from the camera.

4. The method of claim 3, wherein the changing shifts the symmetric pattern to an asymmetric pattern in which a center of maximum intensity of the emitted IR radiation is greater than 45 degrees from the center axis of the IR LED.

5. The method of claim 4, wherein the changing shifts IR radiation intensity away from the camera at a side closest to the camera and forms a radiation pattern that has uniform maximum radiant intensity that is substantially squared at a side away from the camera.

6. An infrared (IR) illuminator for providing IR radiation for a vision camera having a wide-angle lens with a respective wide field of view, comprising:
    an illuminator structure arranged adjacent to the vision camera;
    at least one IR Light Emitting Diode (LED) mounted to the illuminator structure; and
    a cover lens positioned to cover the at least one IR LED, wherein the cover lens changes an IR radiation produced by the at least one IR LED from a symmetric pattern into an asymmetric pattern using a cover optic in a manner that prevents an emitted infrared radiation from entering into a camera lens; and
    wherein a pair of illuminator structures are arranged adjacent to and at opposite sides of the vision camera, where the at least one IR LED is mounted to each illuminator structure, wherein each illuminator structure and the at least one IR LED are identical and arranged flipped 180 degrees to emit a number of complementary asymmetrical patterns.

* * * * *